(12) United States Patent
Hayashi et al.

(10) Patent No.: US 11,770,090 B2
(45) Date of Patent: Sep. 26, 2023

(54) INTERCONNECTED INVERTER SYSTEM AND METHOD OF MANUFACTURING INTERCONNECTED INVERTER SYSTEM

(71) Applicant: TOYOTA JIDOSHA KABUSHIKI KAISHA, Aichi-ken (JP)

(72) Inventors: Kazuhito Hayashi, Toyota (JP); Ikuhiro Nakamura, Nisshin (JP); Kojiro Asakawa, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/696,865

(22) Filed: Mar. 17, 2022

(65) Prior Publication Data

US 2022/0302866 A1 Sep. 22, 2022

(30) Foreign Application Priority Data

Mar. 22, 2021 (JP) ................. 2021-047344

(51) Int. Cl.
| | |
|---|---|
| *B60L 15/20* | (2006.01) |
| *H02P 27/06* | (2006.01) |
| *H02J 3/32* | (2006.01) |
| *B60L 50/51* | (2019.01) |
| *H02M 7/537* | (2006.01) |

(52) U.S. Cl.
CPC .............. *H02P 27/06* (2013.01); *B60L 50/51* (2019.02); *H02J 3/322* (2020.01); *H02M 7/537* (2013.01); *B60L 2210/42* (2013.01)

(58) Field of Classification Search
CPC ...... H02P 27/06; B60L 50/51; B60L 2210/42; H02J 3/322; H02M 7/537
See application file for complete search history.

(56) References Cited

U.S. PATENT DOCUMENTS

| | | | | |
|---|---|---|---|---|
| 5,808,428 | A | * | 9/1998 | Ito ...................... B60L 15/2045 340/636.15 |
| 2020/0164862 | A1 | * | 5/2020 | Muta ..................... F02D 41/029 |
| 2020/0220479 | A1 | * | 7/2020 | Miyazaki .............. H02P 29/032 |

FOREIGN PATENT DOCUMENTS

JP          2017212861 A       11/2017

* cited by examiner

Primary Examiner — Cortez M Cook
(74) Attorney, Agent, or Firm — HAUPTMAN HAM, LLP

(57) ABSTRACT

An interconnected inverter system includes an inverter circuit that converts DC power from a DC power supply into AC power and provides AC power to an AC power line, a voltage sensor that detects a voltage of DC power on a DC power supply side of the inverter circuit, a DC current sensor that detects a current of DC power on the DC power supply side of the inverter circuit, and a motor ECU that controls the inverter circuit. The motor ECU calculates actual power of AC power provided from the inverter circuit by using a product of a voltage value detected by the voltage sensor and a current value detected by the DC current sensor and controls the inverter circuit such that calculated actual power follows a power command value from outside of the interconnected inverter system.

4 Claims, 5 Drawing Sheets

INTERCONNECTED INVERTER SYSTEM AND METHOD OF MANUFACTURING INTERCONNECTED INVERTER SYSTEM

This nonprovisional application is based on Japanese Patent Application No. 2021-047344 filed with the Japan Patent Office on Mar. 22, 2021, the entire contents of which are hereby incorporated by reference.

BACKGROUND

Field

This disclosure relates to an interconnected inverter system and a method of manufacturing an interconnected inverter system, and particularly to an interconnected inverter system suitable for interconnecting direct-current (DC) power to a power line for alternating-current (AC) power and a method of manufacturing the interconnected inverter system.

Description of the Background Art

An apparatus including a measurement value obtaining unit that obtains a measurement value relating to electric power that flows through a power line between a power grid and a load, an instruction value obtaining unit that obtains an instruction value indicating electric power to be provided to the power line from a power storage device, and a calculator that calculates a correction coefficient for correction of the instruction value such that the measurement value is set to a corresponding instruction value when electric power provided from the power storage device is controlled in accordance with the instruction value and controlled electric power is provided to and from the power line has conventionally been available (see, for example, Japanese Patent Laying-Open No. 2017-212861).

SUMMARY

In the apparatus in Japanese Patent Laying-Open No. 2017-212861, a sensor for measuring a grid voltage value is provided, and electric power is controlled by calculating a value of electric power provided to and from the power line by using a voltage and a value of a current provided to and from the power line. Diversion of an inverter system mounted on a vehicle to grid connection is considered. Since the vehicle-mounted inverter system serves to control torque of a motor, it includes a three-phase current sensor, whereas it does not include a three-phase voltage sensor. Therefore, when the vehicle-mounted inverter system is used for grid connection, a circuit component such as a three-phase voltage sensor should be added and cost disadvantageously increases.

This disclosure was made to solve the problem described above, and an object thereof is to provide an interconnected inverter system that can be diverted from a vehicle-mounted inverter system while increase in cost is suppressed and a method of manufacturing the interconnected inverter system.

An interconnected inverter system according to this disclosure includes an inverter circuit that converts DC power from a DC power supply into AC power and provides AC power to an AC power line, a voltage sensor that detects a voltage of DC power on a DC power supply side of the inverter circuit, a DC current sensor that detects a current of DC power on the DC power supply side of the inverter circuit, and a control unit that controls the inverter circuit. The control unit calculates actual power of AC power provided from the inverter circuit by using a product of a voltage value detected by the voltage sensor and a current value detected by the DC current sensor and controls the inverter circuit such that the calculated actual power follows a power command value from outside of the interconnected inverter system.

The voltage sensor is mounted on the vehicle-mounted inverter system, and in some cases, the DC current sensor is also mounted on the vehicle-mounted inverter system. According to such a configuration, actual power can be calculated with the use of these sensors. Therefore, in diversion from the vehicle-mounted inverter system, a three-phase voltage sensor for calculating actual power does not have to be added. Consequently, the interconnected inverter system that can be diverted from the vehicle-mounted inverter system while increase in cost is suppressed can be provided.

The control unit may control the inverter circuit further in consideration of compensation for element loss in the inverter circuit.

Since there is element loss in the inverter circuit, a difference is produced between electric power calculated by using a voltage value on a side of input to the inverter circuit and electric power provided from the inverter circuit. According to such a configuration, by compensating for element loss in the inverter circuit, electric power can more accurately be controlled.

AC current sensors that detect currents of at least two phases of three phases of AC power on an AC power line side of the inverter circuit may further be provided, and the control unit may calculate at least some of the compensation by using current values detected by the AC current sensors.

Element loss in the inverter circuit can be estimated based on a voltage on the side of input to the inverter circuit and a current that flows through the inverter circuit. The current that flows through the inverter circuit correlates with a three-phase current on a side of output from the inverter circuit. When current values of two phases of the three phases are known, a current value of one remaining phase can also be known. According to such a configuration, element loss in the inverter circuit can be estimated and compensated for.

A boost circuit that boosts DC power from the DC power supply may further be provided, and the control unit may calculate compensation for element loss in the boost circuit as at least some of the compensation, by using the current value detected by the DC current sensor.

According to such a configuration, when the inverter circuit includes the boost circuit, element loss in the boost circuit can be compensated for.

According to another aspect of this disclosure, a method of manufacturing an interconnected inverter system is a method of diverting a system including an inverter circuit that converts DC power from a DC power supply into AC power, a voltage sensor that detects a voltage of DC power on a DC power supply side of the inverter circuit, a DC current sensor that detects a current of DC power on the DC power supply side of the inverter circuit, a motor that generates driving force by using AC power from the inverter circuit, and a control unit that controls the inverter circuit.

The method of manufacturing an interconnected inverter system includes providing a terminal for connection to a DC power supply, of input of DC power to the inverter circuit, providing a terminal for connection to an AC power line, of output of AC power from the inverter circuit, and modifying a method of control by the control unit to calculate actual power of AC power provided from the inverter circuit by using a product of a voltage value detected by the voltage sensor and a current value detected by the DC current sensor and to control the inverter circuit such that the calculated actual power follows a power command value from outside of the interconnected inverter system.

According to such a configuration, a method of manufacturing an interconnected inverter system that can be diverted from a vehicle-mounted inverter system while increase in cost is suppressed can be provided.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
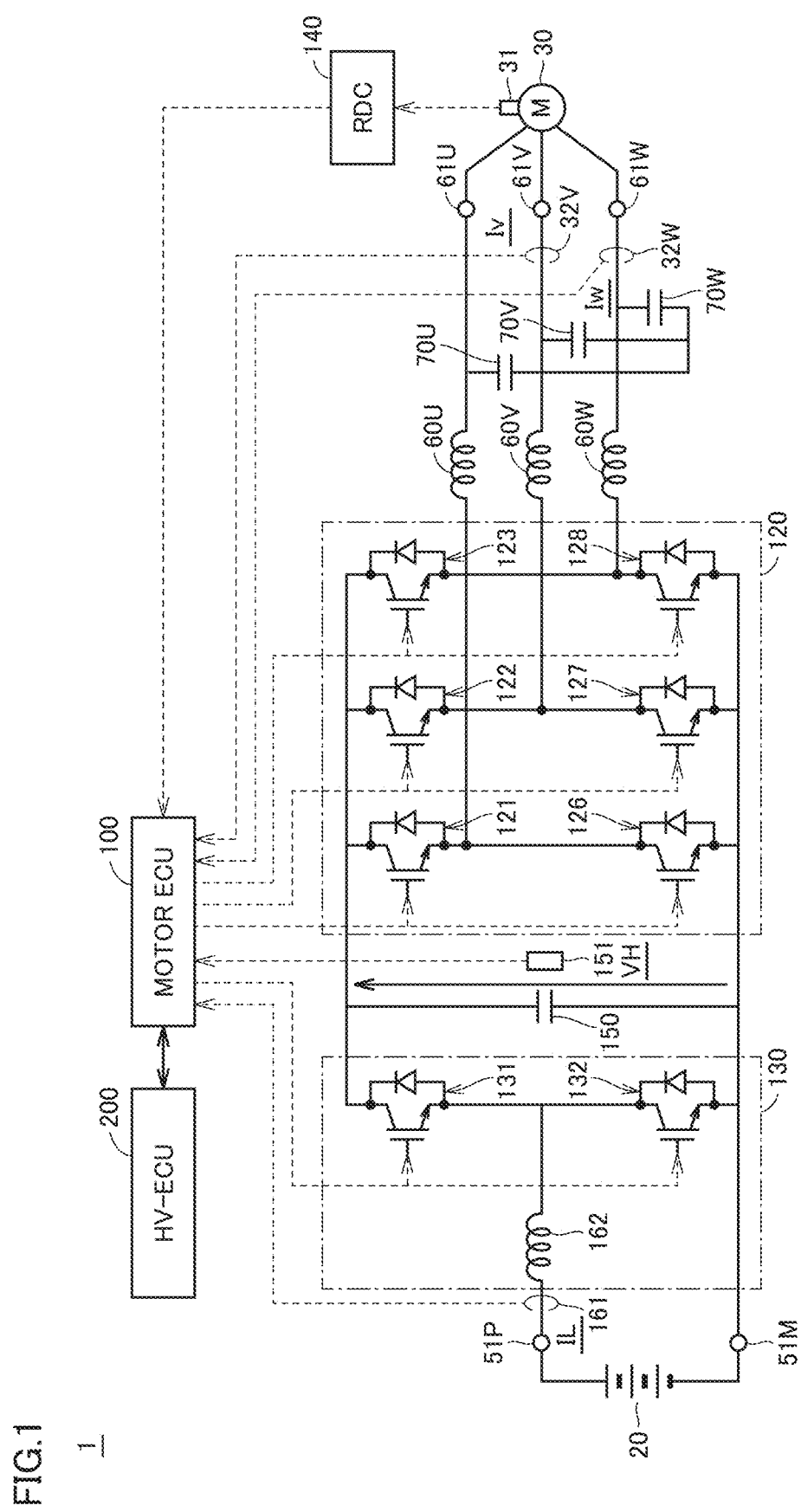
FIG. 1 is a diagram showing overview of a configuration of an inverter system as being mounted on a vehicle in this embodiment.

An embodiment of this disclosure will be described below with reference to the drawings. In the description below, the same elements have the same reference characters allotted and their labels and functions are also the same. Therefore, detailed description thereof will not be repeated.

First Embodiment

FIG. 1 is a diagram showing overview of a configuration of an inverter system as being mounted on a vehicle in this embodiment. Referring to FIG. 1, a vehicle 1 includes a power storage device 20, a motor generator 30, a resolver 31, current sensors 32U and 32W, LC filters for three respective phases implemented by coils 60U, 60V, and 60W and capacitors 70U, 70V, and 70W, a motor ECU 100, an inverter circuit 120, a boost converter circuit 130, a resolver digital converter (which will be denoted as an "RDC" below) 140, a smoothing capacitor 150, a voltage sensor 151, a DC current sensor 161, and an HV-ECU 200.

Motor ECU 100 and HV-ECU 200 each include a central processing unit (CPU) and a memory. Motor ECU 100 controls inverter circuit 120 and boost converter circuit 130. HV-ECU 200 controls the entire system of vehicle 1 including motor ECU 100.

Power storage device 20 includes a battery assembly including a plurality of cells. Each cell is a secondary battery such as a lithium ion battery or a nickel metal hydride battery. Power storage device 20 supplies electric power for generating driving force of vehicle 1 to motor generator 30, and electric power generated by motor generator 30 is stored in power storage device 20.

Boost converter circuit 130 includes a reactor 162 and switching units 131 and 132, and boosts a voltage on a side of power storage device 20 and supplies the boosted voltage toward inverter circuit 120. Switching units 131 and 132 each include a power semiconductor switching element (which is referred to as a "switching element" below) and an anti-parallel diode. The switching element is implemented, for example, by an insulated gate bipolar transistor (IGBT), a power metal oxide semiconductor (MOS) transistor, or a power bipolar transistor. On and off of the switching element is controlled by a control signal from motor ECU 100.

DC current sensor 161 detects a current of DC power provided to boost converter circuit 130 and provides a signal representing the detected current value to motor ECU 100. Smoothing capacitor 150 smoothens a voltage across opposing ends. Voltage sensor 151 detects a voltage across opposing ends of smoothing capacitor 150 and provides a signal representing a detected voltage value to motor ECU 100.

Inverter circuit 120 includes a U-phase upper arm 121, a V-phase upper arm 122, a W-phase upper arm 123, a U-phase lower arm 126, a V-phase lower arm 127, and a W-phase lower arm 128. Inverter circuit 120 converts DC power from boost converter circuit 130 into three-phase AC power and provides resultant three-phase AC power to motor generator 30. U-phase upper arm 121, V-phase upper arm 122, W-phase upper arm 123, U-phase lower arm 126, V-phase lower arm 127, and W-phase lower arm 128 each include a power semiconductor switching element (which is also referred to as a "switching element" below) and an anti-parallel diode. The switching element is implemented, for example, by an IGBT, a power MOS transistor, or a power bipolar transistor. HV-ECU 200 transmits a signal indicating necessary torque to motor ECU 100. On and off of the switching element is controlled by a control signal from motor ECU 100 in accordance with a signal from HV-ECU 200.

Current sensors 32V and 32W detect currents of the V phase and the W phase of a three-phase alternating current provided from inverter circuit 120 and provide signals representing the detected current values to motor ECU 100, respectively.

Motor generator 30 drives wheels of vehicle 1 by rotating in accordance with AC power supplied from inverter circuit 120, and it supplies to inverter circuit 120, three-phase AC power regenerated by regeneration of deceleration force from the wheels. Inverter circuit 120 converts three-phase AC power into DC power and supplies resultant DC power to boost converter circuit 130. Boost converter circuit 130 lowers regenerated DC power from inverter circuit 120 and power storage device 20 is charged with resultant DC power.

Resolver 31 is an angle sensor that provides an angle of rotation of a rotor as two-phase AC voltages (analog signals), and includes an excitation coil, a rotor including a repeating coil, and two-phase output coils arranged to form an angle of 90 degrees with respect to each other with a rotation shaft of the rotor being defined as the center. In carrying out this, the rotor of resolver 31 is connected to a rotation shaft of motor generator 30, and hence resolver 31 functions as an angle sensor for motor generator 30.

When an excitation signal is applied to a primary-side excitation coil in resolver 31, the rotor connected to the shaft of motor generator 30 rotates, and the excitation signal generates induced electromotive force in the repeating coil of the rotating rotor. Induced electromotive force in the repeating coil generates induced electromotive force in the output coils, so that a sin signal and a cos signal corresponding to the angle of the rotor are provided from the two-phase output coils on a secondary side.

RDC 140 is an integrated circuit (IC) that calculates an angle of rotation (which is referred to as a "resolver angle" below) of the rotor of resolver 31 by using a signal provided from resolver 31 and provides a digital signal representing the angle of rotation to motor ECU 100. Since the rotor of resolver 31 is connected to the rotation shaft of motor generator 30 in this embodiment, RDC 140 calculates the angle of rotation of motor generator 30.

Figure 2:
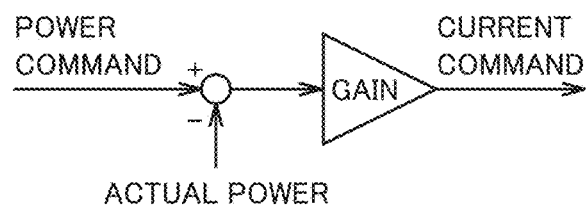
FIG. 2 is a block diagram showing a conventional flow for obtaining a current command for controlling the inverter system used for grid connection.

Diversion of the inverter system mounted on vehicle 1 to grid connection is considered. FIG. 2 is a block diagram showing a conventional flow for obtaining a current command for controlling the inverter system used for grid connection. Referring to FIG. 2, an inverter system of a voltage type normally controls an output current. In controlling output power in the inverter system used for grid connection, a power command is replaced with a current command. Specifically, as shown in FIG. 2, a current command is obtained by multiplying a result of subtraction of actual power from a power command by a gain. Motor ECU 100 controls inverter circuit 120 with a known method in accordance with this current command. Actual power provided from inverter circuit 120 thus follows a power command from the outside of the interconnected inverter system.

Figure 3:
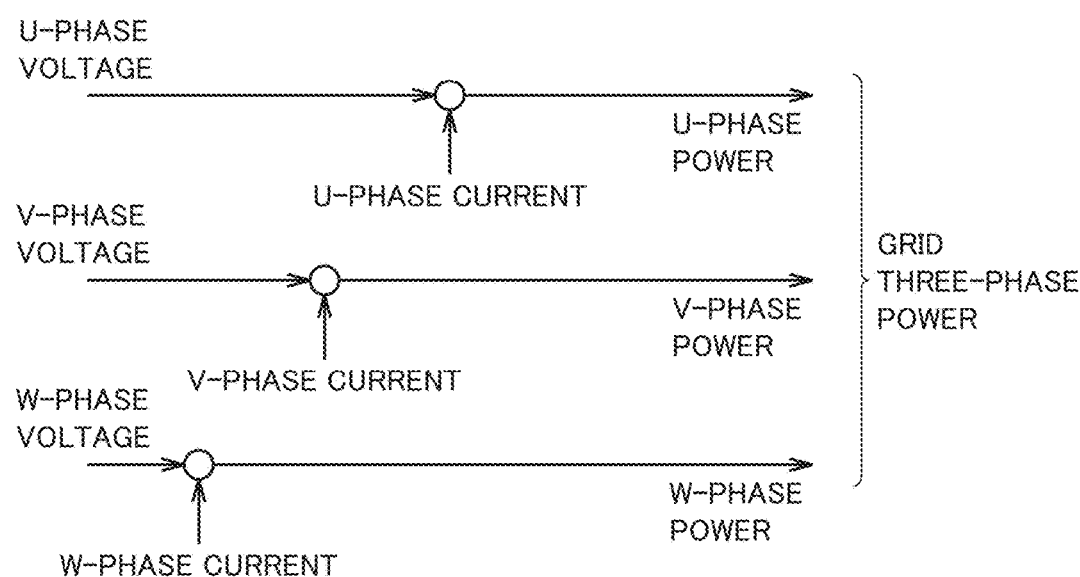
FIG. 3 is a block diagram showing a conventional flow for obtaining actual power provided from the inverter system used for grid connection.

FIG. 3 is a block diagram showing a conventional flow for obtaining actual power provided from the inverter system used for grid connection. Referring to FIG. 3, actual power of the U-phase is calculated from a voltage value obtained by the voltage sensor and a current value obtained by the current sensor, of the U phase of output power from the inverter system to the grid. Similarly, actual power of the V phase and actual power of the W phase are calculated from voltage values obtained by the voltage sensors and current values obtained by the current sensors, of the respective V phase and W phase of output power from the inverter system to the grid. Actual power of three-phase power to the grid is calculated from calculated actual power of the U phase, the V phase, and the W phase.

The vehicle-mounted inverter system serves to control torque of motor generator 30. Therefore, it includes a current sensor for three-phase AC power, whereas it does not include a voltage sensor for three-phase AC power. Therefore, when the vehicle-mounted inverter system is used for grid connection, a circuit component such as a voltage sensor for three-phase AC power should be added and cost disadvantageously increases.

In this disclosure, an inverter system 10 diverted to grid connection includes inverter circuit 120 that converts DC power from power storage device 20 which is a DC power supply into AC power and provides AC power to an AC power line, voltage sensor 151 that detects a voltage of DC power on a DC power supply side of inverter circuit 120, DC current sensor 161 that detects a current of DC power on the DC power supply side of inverter circuit 120, and motor ECU 100 that controls inverter circuit 120. Motor ECU 100 calculates actual power of AC power provided from inverter circuit 120 by using a product of a voltage value detected by voltage sensor 151 and a current value detected by DC current sensor 161 and controls inverter circuit 120 such that calculated actual power follows a power command value from outside of the interconnected inverter system.

Voltage sensor 151 is mounted on the vehicle-mounted inverter system, and in some cases, DC current sensor 161 is also mounted on the vehicle-mounted inverter system. Since actual power can thus be calculated by using these sensors, in diversion from the vehicle-mounted inverter system, a voltage sensor for three-phase AC power for calculating actual power does not have to be added. Consequently, inverter system 10 for interconnection that can be diverted from the vehicle-mounted inverter system while increase in cost is suppressed can be provided.

Referring again to FIG. 1, for diversion, initially, in the vehicle-mounted inverter system, a step of providing terminals 51P and 51M in an electric wire on a power storage device 20 side of boost converter circuit 130 is performed and a step of providing terminals 61U, 61V, and 61W in electric wires of three phases on the output side of inverter circuit 120 is performed.

Figure 4:
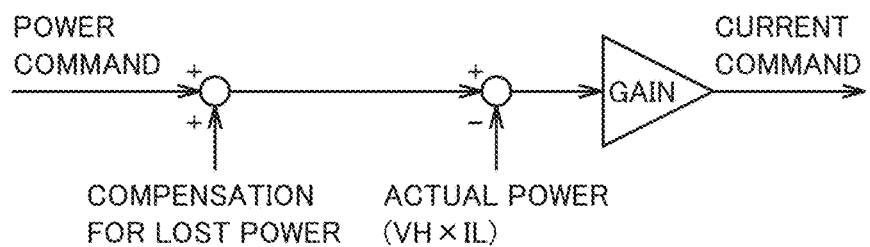
FIG. 4 is a block diagram showing a flow for obtaining a current command for controlling the inverter system used for grid connection in an embodiment of this disclosure.

Then, a step of changing a program for obtaining a current command stored in the memory of motor ECU 100 from a program for computation shown in FIG. 2 to a program for computation shown in FIG. 4 is performed. Through these steps, inverter system 10 for the grid is obtained.

FIG. 4 is a block diagram showing a flow for obtaining a current command for controlling inverter system 10 used for grid connection in an embodiment of this disclosure. Referring to FIG. 4, unlike the conventional method shown in FIG. 2, a current command is obtained by multiplying by a gain, a result of subtraction of actual power from a power command for which lost power in a circuit such as inverter circuit 120 and boost converter circuit 130 is compensated. Actual power is calculated by multiplying a voltage value VH of DC power detected by voltage sensor 151 and provided to inverter circuit 120 by a current value IL of DC power detected by DC current sensor 161 and provided to inverter circuit 120.

TABLE 1

| IL (A)   | −100 | −50 | 0 | 50  | 100 |
|----------|------|-----|---|-----|-----|
| Loss (W) | 500  | 300 | 0 | 200 | 400 |

Table 1 shows an exemplary map for computing element loss in boost converter circuit 130. Referring to Table 1, by using such a map, on loss (W) of an upper element of boost converter circuit 130 can be specified, with a current value IL (A) of DC power detected by DC current sensor 161 being defined as an argument. For example, when IL is 50 (A), loss is 200 (W). A figure in Table 1 is a hypothetical value.

TABLE 2

|          |     | Iv (Arms) | | | | |
|----------|-----|-----------|----|------|------|------|
| Loss (W) |     | 0         | 25 | 50   | 75   | 100  |
| VH (V)   | 200 | 10        | 300 | 600  | 800  | 1000 |
|          | 400 | 10        | 600 | 1200 | 1600 | 2000 |
|          | 600 | 10        | 1200 | 1800 | 2400 | 3000 |

Table 2 shows an exemplary map for computing element loss in inverter circuit 120. Referring to Table 2, by using such a map, loss (W) in upper and lower elements of the V phase can be specified, with voltage value VH of DC power detected by voltage sensor 151 and a DC converted value Iv (Arms (root mean square)) of the current value of the V phase of three-phase AC power detected by current sensor 32V being defined as arguments. Element loss can be determined by voltage value VH and a current that flows through an element. A current that flows through the element correlates with current Iv on a side opposite to an element of the LC filter. Therefore, element loss in the upper and lower elements of the V phase can be calculated by using voltage value VH and current Iv. For example, when VH is 400 (V) and Iv is 75 (Arms), loss in the upper and lower elements of the V phase is 1600 (W). A figure in Table 2 is a hypothetical value.

Similarly, by using the map as in Table 2, loss (W) in upper and lower elements of the W phase can be specified, with voltage value VH of DC power detected by voltage sensor 151 and a DC converted value Iw (Arms) of the current value of the W phase of three-phase AC power detected by current sensor 32W being defined as arguments.

A DC converted value Iu (Arms) of a current value of the U phase of three-phase AC power can be found from DC converted values Iv and Iw of current values of the V phase and the W phase of three-phase AC power detected by respective current sensors 32V and 32W. By using the map as in Table 2, loss (W) in upper and lower elements of the U phase can be specified, with voltage value VH of DC power detected by voltage sensor 151 and a DC converted value Iu (Arms) of the current value of the U phase of three-phase AC power being defined as arguments.

Figure 5:
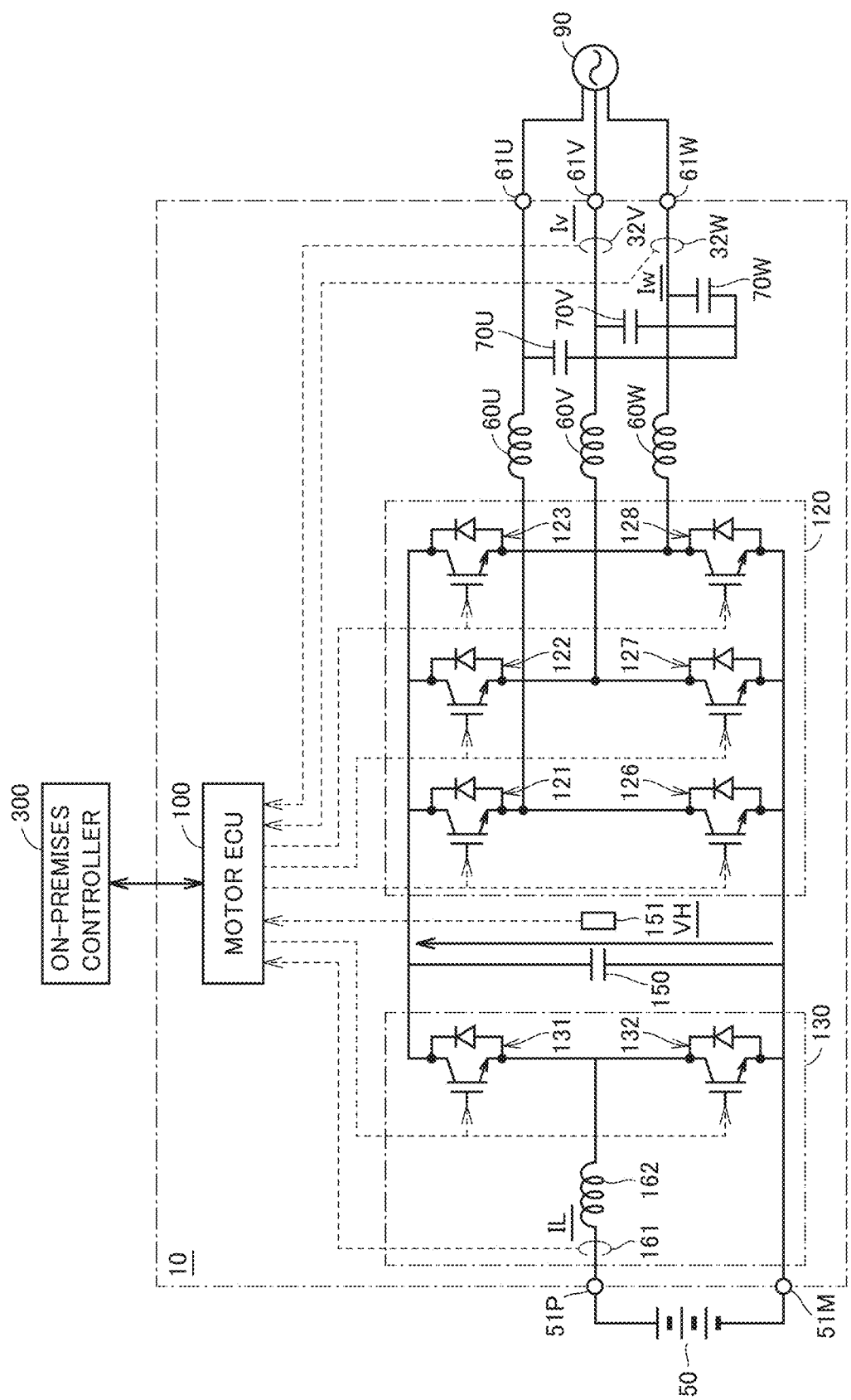
FIG. 5 is a diagram showing overview of a configuration of the inverter system diverted from a vehicle-mount application to a grid connection application in a first embodiment.

FIG. 5 is a diagram showing overview of a configuration of inverter system 10 diverted from the vehicle-mount application to the grid connection application in a first embodiment. Referring to FIG. 5, since a circuit between terminals 51P and 51M and terminals 61U, 61V, and 61W of inverter system 10 for the grid connection application and motor ECU 100 are similar to those of the vehicle-mounted inverter system described with reference to FIG. 1, redundant description will not be repeated.

An on-premises controller 300 is an apparatus for controlling a power grid 90 in a structure such as a house or a building, and includes a CPU and a memory. In this embodiment, in diversion of a system from the vehicle-mount application to the grid connection application, on-premises controller 300 is connected to motor ECU 100 through a local area network (LAN). On-premises controller 300 provides a power command to motor ECU 100 through the LAN.

In diversion, battery 50 is connected to terminals 51P and 51M and three-phase AC power grid 90 is connected to terminals 61U, 61V, and 61W. Battery 50 may be any battery such as a primary battery, a secondary battery, a solar cell, and a fuel cell. Upper switching unit 131 of boost converter circuit 130 is turned on and lower switching unit 132 is turned off.

Second Embodiment

In the first embodiment, diversion of the inverter system for the vehicle-mounted application that includes boost converter circuit 130 to inverter system 10 for the grid connection application is described. In a second embodiment, diversion of the inverter system for the vehicle-mounted application that does not include boost converter circuit 130 to an inverter system 10A for the grid connection application will be described.

Figure 6:
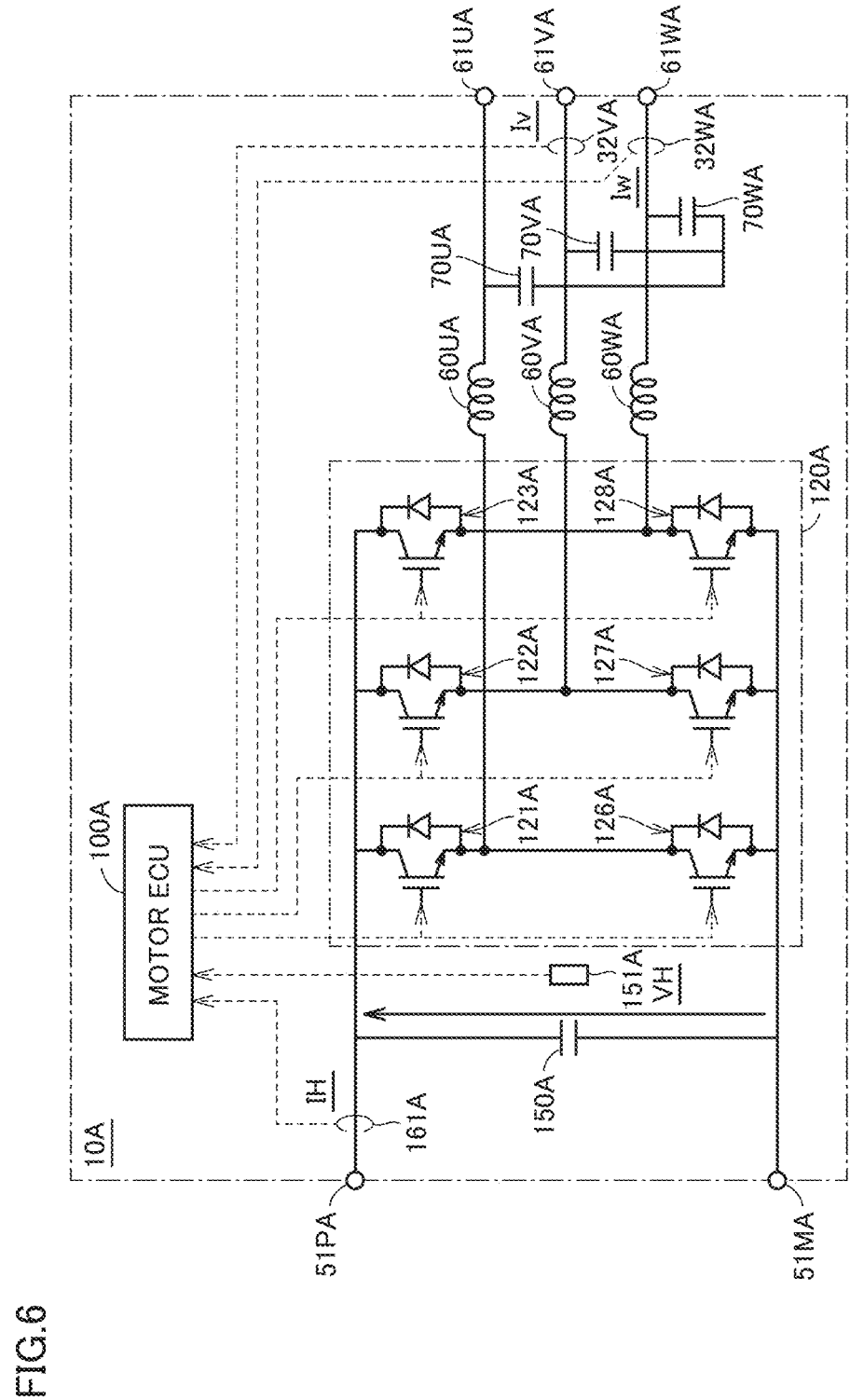
FIG. 6 is a diagram showing overview of a configuration of an inverter system diverted from the vehicle-mount application to the grid connection application in a second embodiment.

FIG. 6 is a diagram showing overview of a configuration of inverter system 10A diverted from the vehicle-mount application to the grid connection application in the second embodiment. Referring to FIG. 6, since DC current sensor 161 included in boost converter circuit 130 in the first embodiment is not provided, a DC current sensor 161A is newly provided.

DC current sensor 161A detects a current of DC power provided to an inverter circuit 120A and provides a signal representing a detected current value IH to motor ECU 100. Thus, as in the first embodiment, actual power provided from inverter circuit 120A is calculated by multiplying voltage value VH of DC power detected by a voltage sensor 151A and provided to inverter circuit 120A by current value IH of DC power detected by DC current sensor 161A and provided to inverter circuit 120A.

Lost power in inverter circuit 120A can be calculated as described with reference to Table 2 in the first embodiment. Since the boost converter circuit is not provided, lost power in the boost converter circuit does not have to be taken into consideration.

When DC current sensor 161A is provided as in this second embodiment, cost can be lower than in an example in which a voltage sensor for three-phase AC power is newly provided as in a conventional example.

Third Embodiment

In the first embodiment, diversion of the inverter system for the vehicle-mounted application that includes boost converter circuit 130 of a relatively new type that includes DC current sensor 161 to the inverter system for the grid connection application is described. In a third embodiment, diversion of the inverter system for the vehicle-mounted application that includes a boost converter circuit 130B of a relatively old type without including DC current sensor 161 to an inverter system 10B for the grid connection application will be described.

Figure 7:
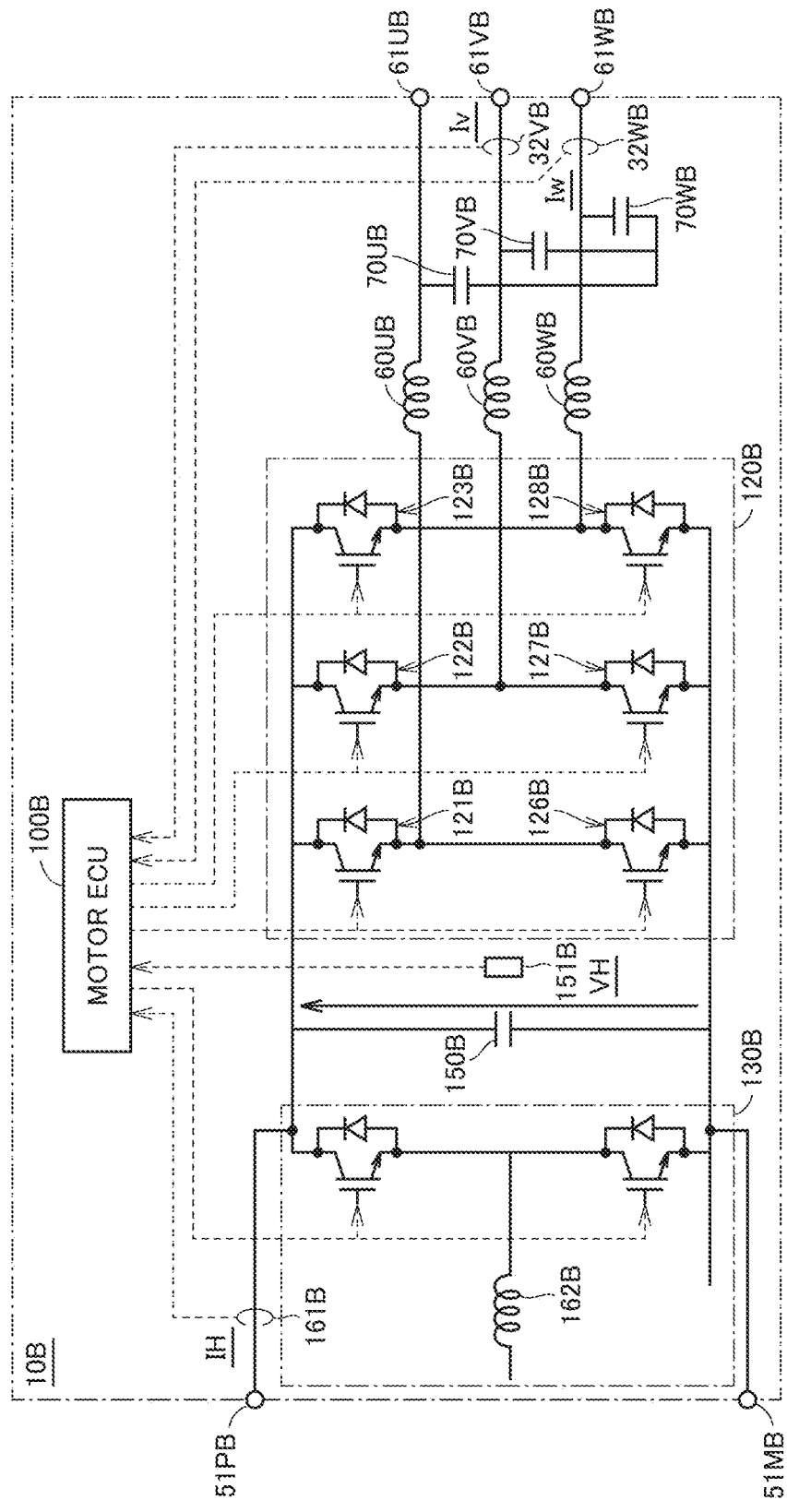
FIG. 7 is a diagram showing overview of a configuration of an inverter system diverted from the vehicle-mount application to the grid connection application in a third embodiment.

FIG. 7 is a diagram showing overview of a configuration of inverter system 10B diverted from the vehicle-mount application to the grid connection application in the third embodiment. Referring to FIG. 7, DC current sensor 161 included in boost converter circuit 130 in the first embodiment is not provided, and hence a DC current sensor 161B is newly provided.

DC current sensor 161B detects a current of DC power provided to an inverter circuit 120B and provides a signal representing detected current value IH to motor ECU 100. Thus, as in the first embodiment, actual power provided from inverter circuit 120B is calculated by multiplying voltage value VH of DC power detected by a voltage sensor 151B and provided to inverter circuit 120B by current value IH of DC power detected by DC current sensor 161B and provided to inverter circuit 120B.

Lost power in inverter circuit 120B can be calculated as described with reference to Table 2 in the first embodiment. Though boost converter circuit 130B is provided, it is bypassed. Therefore, lost power in boost converter circuit 130B does not have to be taken into consideration.

When DC current sensor 161B is provided as in this third embodiment, cost can be lower than in an example in which a voltage sensor for three-phase AC power is newly provided as in the conventional example.

Other Modifications (1) In the embodiments described previously, as described with reference to FIG. 4, lost power is compensated for. Without being limited as such, lost power does not have to be compensated for.

(2) In the embodiments described previously, as described with reference to FIGS. 4 and 5, lost power in both of inverter circuit 120 and boost converter circuit 130 is compensated for. Without being limited as such, lost power in one of inverter circuit 120 and boost converter circuit 130 may be compensated for.

(3) In the embodiments described previously, as shown in FIGS. 1 and 5 to 7, current sensors 32V and 32W of the V phase and the W phase are provided as current sensors for AC power. Without being limited as such, current sensors for AC power that detect currents of two phases of three phases should only be provided. For example, current sensors for the U phase and the V phase may be provided or current sensors for the U phase and the W phase may be provided.

(4) In the embodiments described previously, as shown in FIGS. 1 and 4 to 7, a sensor necessary for calculating actual power of output power from inverter circuit 120 and lost power in inverter circuit 120 and boost converter circuit 130 is described. Without being limited as such, another sensor may be provided. For example, a sensor that detects a voltage of any of a three-phase alternating current used for synchronization with a frequency or a phase of a grid voltage may be provided.

(5) In the embodiments described previously, as shown in FIG. 5, diversion of the inverter system for the vehicle-mount application to inverter system 10 for the grid connection application within a structure is shown. Without being limited as such, the vehicle-mounted inverter system may be diverted for grid connection with a power grid of an electric power company. In this case, motor ECU 100 may be connected to a server of the electric power company, instead of on-premises controller 300.

(6) In the embodiments described previously, as shown in FIG. 5, interconnection with power grid 90 is described. Without being limited as such, interconnection with an AC power line independent of the power grid may be achieved.

(7) In the embodiments described previously, as shown in FIG. 5, conversion of DC power in battery 50 into AC power by inverter system 10 and supply of AC power to the AC power line of power grid 90 are described. AC power in power grid 90, however, may be converted to DC power by inverter system 10 and battery 50 may be charged with resultant DC power.

(8) The embodiments described previously may be understood as disclosure of inverter system 10, 10A, or 10B for an interconnection application as shown in FIGS. 5 to 7, as disclosure of a method of manufacturing inverter system 10, 10A, or 10B for the interconnection application by diverting an inverter system for the vehicle-mount application to inverter system 10, 10A, or 10B for the interconnection application, as disclosure of a method of diverting an inverter system for the vehicle-mount application to inverter system 10, 10A, or 10B for the interconnection application, or as disclosure of a method of interconnection to a power grid or an independent power line by means of inverter system 10, 10A, or 10B for the interconnection application.

SUMMARY (1) As shown in FIGS. 1 and 5 to 7, an interconnected inverter system (for example, interconnected inverter system 10, 10A, or 10B) includes an inverter circuit (for example, inverter circuit 120, 120A, or 120B) that converts DC power from a DC power supply into AC power and provides AC power to an AC power line, a voltage sensor (for example, voltage sensor 151, 151A, or 151B) that detects a voltage of DC power on a DC power supply side of the inverter circuit, a DC current sensor (for example, DC current sensor 161, 161A, or 161B) that detects a current of DC power on the DC power supply side of the inverter circuit, and a control unit (for example, motor ECU 100, 100A, or 100B) that controls the inverter circuit. As described with reference to FIG. 4, the control unit calculates actual power of AC power provided from the inverter circuit by using a product of a voltage value detected by the voltage sensor and a current value detected by the DC current sensor and controls the inverter circuit such that the calculated actual power follows a power command value from outside of the interconnected inverter system.

The voltage sensor is mounted on the vehicle-mounted inverter system, and in some cases, the DC current sensor is also mounted on the vehicle-mounted inverter system. Thus, actual power can be calculated with the use of these sensors. Therefore, in diversion from the vehicle-mounted inverter system, a three-phase voltage sensor for calculating actual power does not have to be added. Consequently, the interconnected inverter system that can be diverted from the vehicle-mounted inverter system while increase in cost is suppressed can be provided.

(2) As shown in FIG. 4 and Table 2, the control unit controls the inverter circuit further in consideration of compensation for element loss in the inverter circuit.

Since there is element loss in the inverter circuit, a difference is produced between electric power calculated by using a voltage value on a side of input to the inverter circuit and electric power provided from the inverter circuit. Thus, by compensating for element loss in the inverter circuit, electric power can more accurately be controlled.

(3) As shown in FIGS. 1 and 5 to 7, the interconnected inverter system further includes AC current sensors (for example, current sensors 32V and 32W) that detect currents of at least two phases of three phases of AC power on an AC power line side of the inverter circuit. As shown in FIG. 4 and Table 2, the control unit calculates at least some of the compensation by using current values detected by the AC current sensors.

Element loss in the inverter circuit can be estimated based on a voltage on the side of input to the inverter circuit and a current that flows through the inverter circuit. The current that flows through the inverter circuit correlates with a three-phase current on a side of output from the inverter circuit. When current values of two phases of the three phases are known, a current value of one remaining phase can also be known. Thus, element loss in the inverter circuit can be estimated and compensated for.

(4) As shown in FIGS. 1 and 5, the interconnected inverter system further includes a boost circuit (for example, boost converter circuit 130 or 130B) that boosts DC power from the DC power supply. As shown in FIG. 4 and Table 1, the control unit calculates compensation for element loss in the boost circuit as at least some of the compensation, by using the current value detected by the DC current sensor.

Thus, when the inverter circuit includes the boost circuit, element loss in the boost circuit can be compensated for.

(5) As shown in FIGS. 1 and 5 to 7, a method of manufacturing an interconnected inverter system is a method of diverting a system including an inverter circuit that converts DC power from a DC power supply into AC power, a voltage sensor that detects a voltage of DC power on a DC power supply side of the inverter circuit, a DC current sensor that detects a current of DC power on the DC power supply side of the inverter circuit, a motor that generates driving force by using AC power from the inverter circuit, and a control unit that controls the inverter circuit.

As described with reference to FIGS. 1, 4, and 5, the method of manufacturing an interconnected inverter system includes providing a terminal (for example, terminals 51P and 51M, 51PA and 51MA, or 51PB and 51MB) for connection to a DC power supply, of input of DC power to the inverter circuit, providing a terminal (for example, terminals 61U, 61V, and 61W, 61UA, 61VA, and 61WA, or 61UB, 61VB, and 61WB) for connection to an AC power line, of output of AC power from the inverter circuit, and modifying a method of control by the control unit (for example, changing a program for obtaining a current command stored in the memory of motor ECU 100 from a program for computation shown in FIG. 2 to a program for computation shown in FIG. 4) to calculate actual power of AC power provided from the inverter circuit by using a product of a voltage value detected by the voltage sensor and a current value detected by the DC current sensor and to control the inverter circuit such that the calculated actual power follows a power command value from outside of the interconnected inverter system.

Thus, a method of manufacturing an interconnected inverter system that can be diverted from a vehicle-mounted inverter system while increase in cost is suppressed can be provided.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. An interconnected inverter system, comprising:
   an inverter circuit that converts DC power from a DC power supply into AC power and provides AC power to an AC power line;
   a voltage sensor that detects a voltage of DC power on a DC power supply side of the inverter circuit;
   a DC current sensor that detects a current of DC power on the DC power supply side of the inverter circuit; and
   a control unit that controls the inverter circuit, wherein the control unit
      calculates actual power of AC power provided from the inverter circuit by using a product of a voltage value detected by the voltage sensor and a current value detected by the DC current sensor, and
      controls the inverter circuit such that the calculated actual power follows a power command value from outside of the interconnected inverter system,
   wherein the control unit controls the inverter circuit further in consideration of compensation for element loss in the inverter circuit.

2. The interconnected inverter system according to claim 1, further comprising AC current sensors that detect currents of at least two phases of three phases of AC power on an AC power line side of the inverter circuit, wherein
   the control unit calculates at least some of the compensation by using current values detected by the AC current sensors.

3. The interconnected inverter system according to claim 1, further comprising a boost circuit that boosts DC power from the DC power supply, wherein
   the control unit calculates compensation for element loss in the boost circuit as at least some of the compensation, by using the current value detected by the DC current sensor.

4. A method of manufacturing an interconnected inverter system, the method being a method of diverting a system, the system including
   an inverter circuit that converts DC power from a DC power supply into AC power,
   a voltage sensor that detects a voltage of DC power on a DC power supply side of the inverter circuit,
   a DC current sensor that detects a current of DC power on the DC power supply side of the inverter circuit,
   a motor that generates driving force by using AC power from the inverter circuit, and
   a control unit that controls the inverter circuit,
   the method comprising:
   providing a terminal for connection to the DC power supply, of input of DC power to the inverter circuit;
   providing a terminal for connection to an AC power line, of output of AC power from the inverter circuit; and
   modifying a method of control by the control unit (i) to calculate actual power of AC power provided from the inverter circuit by using a product of a voltage value detected by the voltage sensor and a current value detected by the DC current sensor and (ii) to control the inverter circuit such that the calculated actual power follows a power command value from outside of the interconnected inverter system,
   wherein the control unit controls the inverter circuit further in consideration of compensation for element loss in the inverter circuit.

* * * * *